United States Patent
Salley et al.

(10) Patent No.: US 8,087,225 B2
(45) Date of Patent: Jan. 3, 2012

(54) ARTICULATED TRANSPORT ARRANGEMENT FOR WINDROWER WITH CUTTING PLATFORM

(75) Inventors: Gordon Lee Salley, Moline, IL (US); Thomas Daryl Bebernes, Ottumwa, IA (US)

(73) Assignee: Deere & Company, Moline, IL (US)

( * ) Notice: Subject to any disclaimer, the term of this patent is extended or adjusted under 35 U.S.C. 154(b) by 260 days.

(21) Appl. No.: 12/028,892

(22) Filed: Feb. 11, 2008

(65) Prior Publication Data

US 2009/0199530 A1    Aug. 13, 2009

(51) Int. Cl. *A01B 73/00* (2006.01)
(52) U.S. Cl. .......................................... 56/228; 56/14.9
(58) Field of Classification Search .................. 56/14.9, 56/15.1, 15.4, 134, 228, DIG. 9, DIG. 14
See application file for complete search history.

(56) References Cited

U.S. PATENT DOCUMENTS

| | | | | |
|---|---|---|---|---|
| 2,806,707 A * | 9/1957 | Christie | ............................ | 280/29 |
| 3,304,699 A * | 2/1967 | Koch et al. | ....................... | 56/14.4 |
| 3,317,802 A | 5/1967 | Ogden | | |
| 3,485,020 A * | 12/1969 | Burrough et al. | ................ | 56/212 |
| 3,710,214 A | 1/1973 | Anderson | | |
| 3,834,480 A * | 9/1974 | McGee | ........................... | 180/419 |
| 4,135,592 A | 1/1979 | Wincent | | |
| 4,206,582 A * | 6/1980 | Molzahn et al. | ................ | 56/15.8 |
| 4,384,445 A * | 5/1983 | McIlwain | ......................... | 56/228 |
| 5,243,810 A | 9/1993 | Fox et al. | | |
| 5,329,451 A * | 7/1994 | Notsu | ............................... | 701/41 |
| 5,785,472 A * | 7/1998 | Smith et al. | ....................... | 410/77 |
| 5,828,971 A * | 10/1998 | Diekhans et al. | ............... | 701/41 |
| 5,904,365 A * | 5/1999 | Dillon | ............................. | 280/419 |
| 5,970,695 A * | 10/1999 | Dunn | ............................... | 56/228 |
| 6,167,982 B1* | 1/2001 | Dillon | ............................ | 180/419 |
| 6,604,351 B2* | 8/2003 | Dillon | ............................ | 56/14.6 |
| 7,143,863 B2 | 12/2006 | Dillon | | |
| 7,147,241 B2* | 12/2006 | Beaujot et al. | ................. | 280/442 |
| 2002/0027025 A1* | 3/2002 | Kobayashi et al. | ............ | 180/6.2 |
| 2006/0117732 A1* | 6/2006 | Wubbels et al. | ................ | 56/14.7 |
| 2006/0142936 A1* | 6/2006 | Dix | ................................ | 701/200 |
| 2008/0028735 A1* | 2/2008 | Janning | ............................ | 56/10.1 |
| 2008/0047248 A1* | 2/2008 | Haffert et al. | .................... | 56/228 |

FOREIGN PATENT DOCUMENTS

| | | |
|---|---|---|
| DE | 3919561 | 12/1990 |
| DE | 9102354 | 5/1991 |
| EP | 1215105 | 6/2002 |
| EP | 1772047 | 4/2007 |
| EP | 1790205 | 5/2007 |
| GB | 1593698 | 7/1981 |

* cited by examiner

*Primary Examiner* — Thomas Will
*Assistant Examiner* — Joan Misa

(57) ABSTRACT

An agricultural windrower includes a traction unit having a frame. A cutting platform has a longitudinal extension, a feeder opening associated with a first mounting location, and a first hitch at an end of the cutting platform associated with a second mounting location. A lift assembly carried by the traction unit frame is configured to mount with the cutting platform at the first mounting location. An articulated transport arrangement is mounted to the traction unit frame. The articulated transport arrangement includes a second hitch configured for mating with the first hitch, and at least one actuator for coupling between and adjusting a relative angular orientation between the frame and the cutting platform when the first hitch and the second hitch are mated together.

17 Claims, 3 Drawing Sheets

ARTICULATED TRANSPORT ARRANGEMENT FOR WINDROWER WITH CUTTING PLATFORM

FIELD OF THE INVENTION

The present invention relates to work machines, and, more particularly, to windrowers with cutting platforms.

BACKGROUND OF THE INVENTION

An agricultural windrower is a large machine used to harvest a variety of crops from a field. The windrower includes a traction unit and a cutting platform mounted to the front of the traction unit. During a harvesting operation, the cutting platform cuts ripened crop from the field. The crop is transported to the rear of the cutting platform and forming shields form a windrow of the crop between the tires of the vehicle for natural dry down of the crop (or, alternatively, windrows formed at the ends of the cutting platform). A subsequent field operation picks up the windrows for further processing, such as separating and cleaning in the case of grain crops, or baling or chopping in the case of hay.

Self-propelled windrowers typically include a pair of drive wheels and one or more caster wheels which are carried by a machine frame and free to rotate about a generally vertical axis 360°. Windrowers are typically driven through a dual-path hydrostatic system. Speed changes are made by adjusting the speed of both drive (front) wheels simultaneously. Direction changes are made by adjusting the relative speed of the drive wheels. The castered rear wheels allow the machine to pivot during direction changes. A caster wheel assembly typically includes a shaft defining an axis of rotation, a fork rigidly attached to the bottom end of the shaft, and a caster wheel coupled with the distal ends of the fork.

Steering characteristics are dependent on such things as steering linkages, hydrostatic pump reaction time, the machine's turning inertia, and caster turn resistance. There is a tendency for a steering input to have a slow reaction (under steer) at initiation, then a tendency to keep turning (over steer) when the input is stopped or reversed. Because of this, control of the machine can be difficult, particularly at higher transport speeds. Windrowers typically have a maximum speed in transport in the 15 miles per hour (mph) range. Transport speeds up to 25 mph would be an advantage in the market. This requires better machine controllability at higher speeds without sacrificing agility (spin steer) at lower speeds.

At least one third party competitor advertises a windrower with a transport speed of 23 mph. This is achieved by reversing the operator's station and operating the machine in the reverse direction for transport.

A secondary problem with current windrower drives is transport of the windrower with the platform removed. Reaction delay can be particularly pronounced if the machine is operated without the platform due to the added weight on the casters and the resulting increase in turn resistance.

It may also be desirable to dismount a platform and transport it by towing it behind the traction unit. This is difficult with current windrower configurations because the rear of the windrower, which is controlled by the drive (front) wheels, must swing in reaction to steering inputs and, conversely, inputs from the towed platform must be resisted by the drive wheels.

The assignee of the present invention currently instructs operators to not transport a windrower traction unit with the platform dismounted. Wider platforms designed to be removed easily from the traction unit increase the importance of transport without a platform.

It is known to transport a windrower without the platform by providing a portable weight to carry in place of the platform during transport. This balances the traction unit and allows "slow speed transport" with the platform in tow. Disadvantages to this approach include the logistics of having the weight with the traction unit when needed, the inconvenience of attaching and removing the weight, and the added cost of the option.

What is needed in the art is a windrower which allows a cutting platform to be easily and effectively towed (or pushed) in transport.

SUMMARY OF THE INVENTION

The invention in one form is directed to an agricultural windrower including a traction unit having a frame. A cutting platform has a longitudinal extension, a feeder opening associated with a first mounting location, and a first hitch at an end of the cutting platform associated with a second mounting location. A lift assembly carried by the traction unit frame is configured to mount with the cuffing platform at the first mounting location. An articulated transport arrangement is mounted to the traction unit frame. The articulated transport arrangement includes a second hitch configured for mating with the first hitch, and at least one actuator for coupling between and adjusting a relative angular orientation between the frame and the cutting platform when the first hitch and the second hitch are mated together.

The invention in another form is directed to a windrower with a transport arrangement for interconnecting a traction unit with a cutting platform. The transport arrangement includes a first hitch attachable to an end of the cutting platform. A second hitch is attachable to the traction unit and configured for mating with the first hitch. At least one actuator is configured for coupling between and adjusting a relative angular orientation between the traction unit and the cutting platform when the first hitch and the second hitch are mated together. An operator input device is couplable with an electrical processing circuit onboard the traction unit. The operator input device is configured for providing a first output signal to the electrical processing circuit for normal steering using only the traction unit, and a second output signal to the electrical processing circuit for articulated steering between the traction unit and the cutting platform.

DETAILED DESCRIPTION OF THE INVENTION

Figure 1:
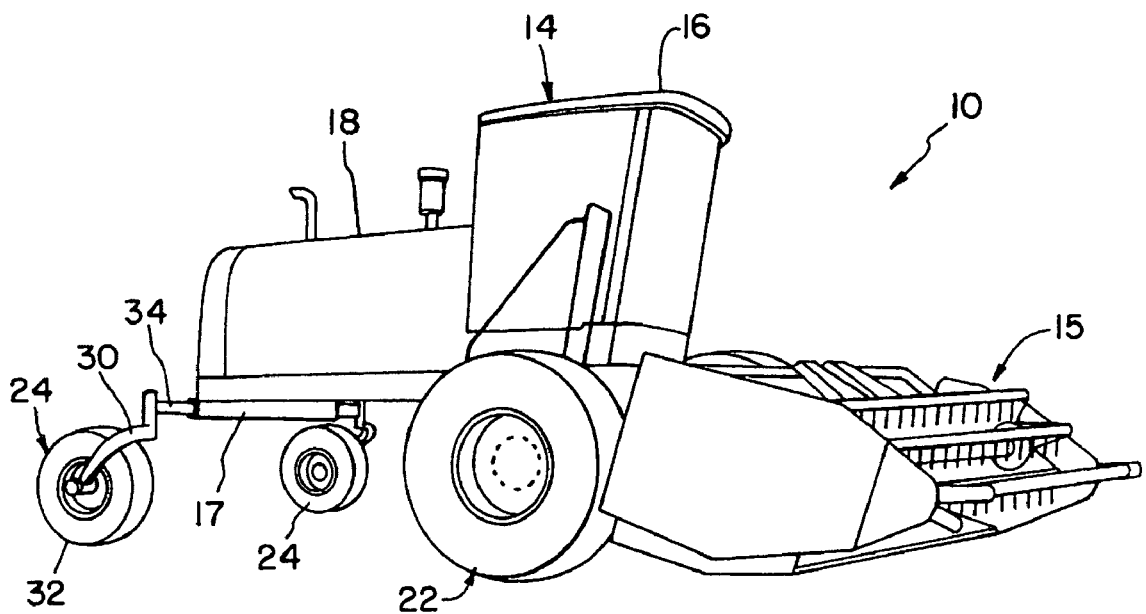
FIG. 1 is a perspective view of an agricultural windrower incorporating an articulated transport arrangement of the present invention.
Figure 2:
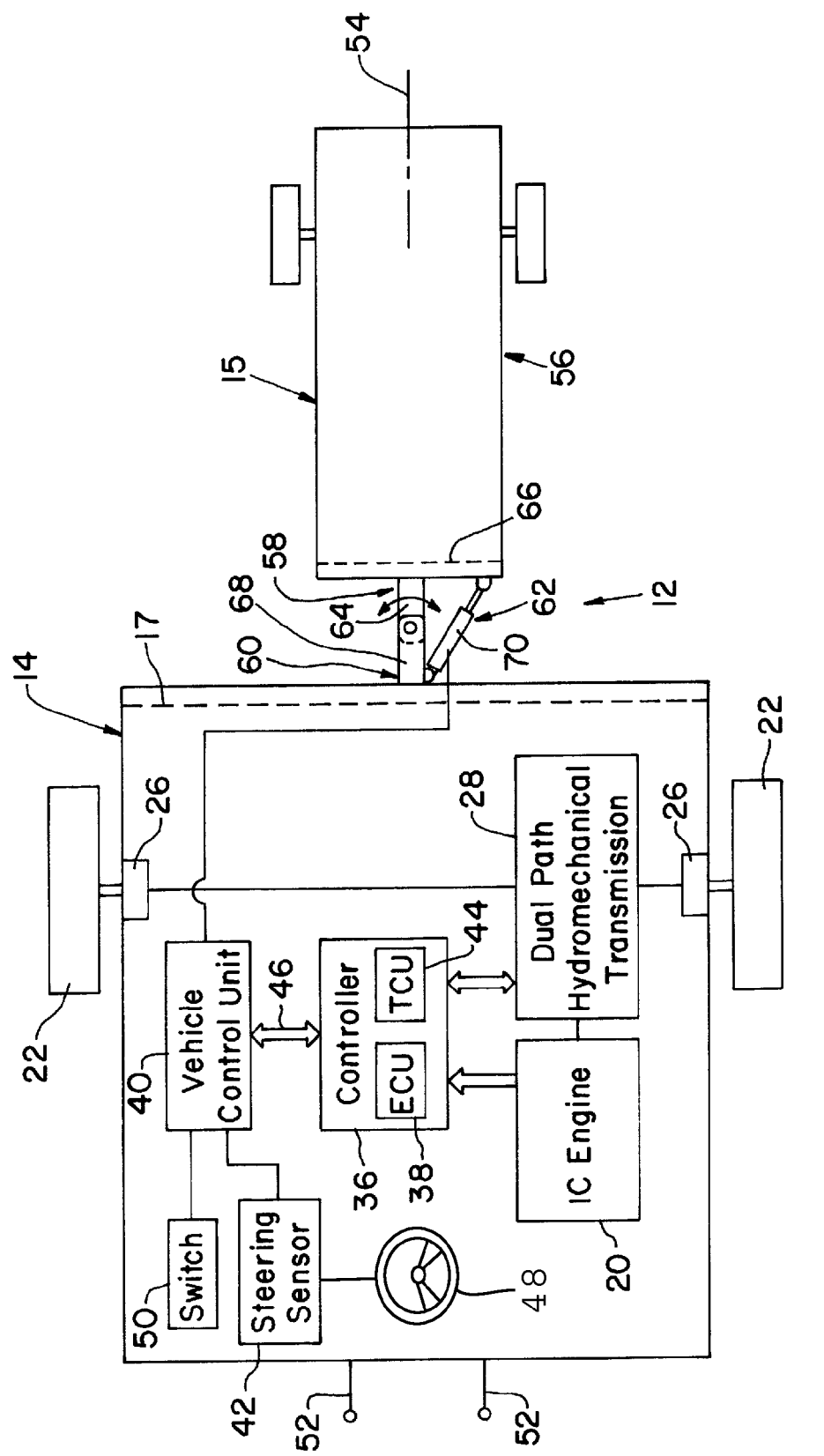
FIG. 2 is a schematic illustration of the windrower shown in FIG. 1, when in a transport configuration.

Referring now to the drawings, and more particularly to FIGS. 1 and 2, conjunctively, there is shown a work machine in the form of a windrower 10 incorporating an embodiment of an articulated transport arrangement 12 of the present invention. Windrower 10 generally includes a traction unit 14 carrying a cutting platform 15, with articulated transport arrangement 12 interconnecting traction unit 14 with cutting platform 15 when in a transport mode.

Traction unit 14 includes a frame 17 carrying typical components such as an operator station 16, engine compartment 18 housing an internal combustion (IC) engine 20, a pair of drive wheels 22, and a pair of rear caster wheel assemblies 24. Drive wheels 22 are typically at the front of traction unit 14 and caster wheel assemblies 24 are typically at the rear of traction unit 14. However, rear caster wheel assemblies 24 are not shown in FIG. 2 for simplicity. Moreover, the figures are intended to show concepts and are not intended to be proportionally correct.

Drive wheels 22 are connected via respective drive motors 26 with a dual path hydrostatic transmission 28. It is also possible to drive the drive wheels 22 with a different type of adjustable transmission, such as a hydromechanical or electromechanical transmission. Using drive wheels 22, windrower 10 is configured to provide two speed ranges: a field range providing a maximum forward speed of about 12 mph during a field mode; and a transport range providing a maximum forward speed of about 25 mph during a transport mode.

Each caster wheel assembly 24 includes a wheel arm 30 and a caster wheel 32. Wheel arm 30 is pivotably coupled at the upper end with machine frame 17, in particular, at the outboard end of a rear axle 34 forming part of machine frame 17. Wheel arm 30 is shown as a single arm which curves around to the side of wheel 32, but can also be configured as a fork with distal ends on opposite sides of wheel 32.

An electrical processing circuit 36 is configured as one or more controllers. In the embodiment shown, controller 36 includes an engine control unit (ECU) 38 which electronically controls operation of IC engine 20, and is coupled with a plurality of sensors (not specifically shown) associated with operation of IC engine 20. For example, ECU 38 may be coupled with a sensor indicating engine control parameters such as an air flow rate within one or more intake manifolds, engine speed, fueling rate and/or timing, exhaust gas recirculation (EGR) rate, turbocharger blade position, etc. Additionally, ECU 38 may receive output signals from vehicle control unit (VCU) 40 representing vehicle control parameters input by an operator, such as a commanded ground speed (indicated by a position of the throttle and/or hydrostat pedal) or a commanded direction of windrower 10 (indicated by an output signal from steering sensor 42 representing an angular orientation or position of a steering input device 48 in the form of a steering wheel, or joystick(s)).

Similarly, transmission control unit (TCU) 44 electronically controls operation of transmission 28, and is coupled with a plurality of sensors associated with operation of transmission 28. ECU 38, VCU 40 and TCU 44 are coupled together via a bus structure providing two-way data flow, such as controller area network (CAN) bus 46.

Although the various electronic components such as ECU 38, VCU 40 and TCU 44 are shown coupled together using wired connections, it should also be understood that wireless connections may be used for certain applications. Further, some of the internal electronic and fluid connections within the components of FIG. 2 are not shown for simplicity sake.

An operator input device in the form of a two position switch 50 is coupled with VCU 40. Switch 50 provides a first output signal to VCU 40 corresponding to a normal steering mode using transmission 28, drive motors 26 and drive wheels 22. Switch 50 also provides a second output signal to VCU 40 corresponding to an articulated steering mode using articulated transport arrangement 12, as will be described below.

Cutting platform 15 is typically detachably mounted at the front end of traction unit 14 below operator station 16 using a lift assembly in the form of a pair of lift arms 52. The lift assembly need not necessarily be in the form of lift arms and may vary depending on the application. Cutting platform 15 has a longitudinal extension 54, and a feeder opening 56 associated with a first mounting location. More particularly, lift arms 52 attach to the rear wall of cutting platform of 15 at the first mounting location and feeder opening 56 is positioned between lift arms 52.

Figure 3:
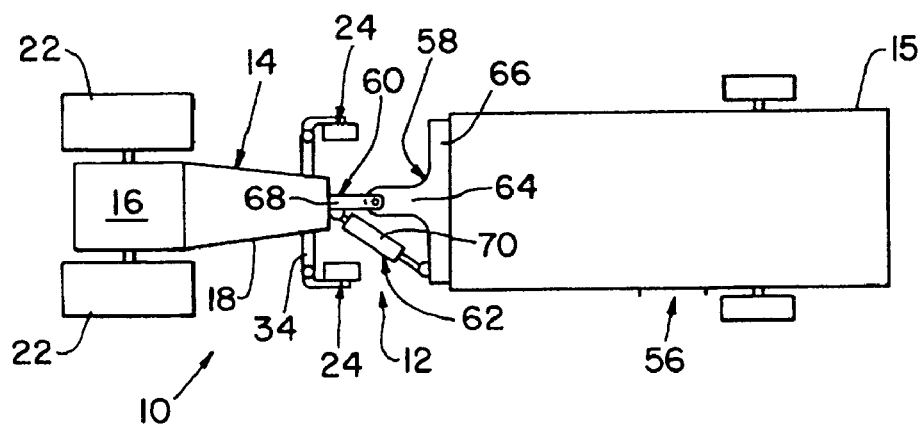
FIG. 3 is a schematic, top view of the windrower shown in FIGS. 1 and 2.
Figure 4:
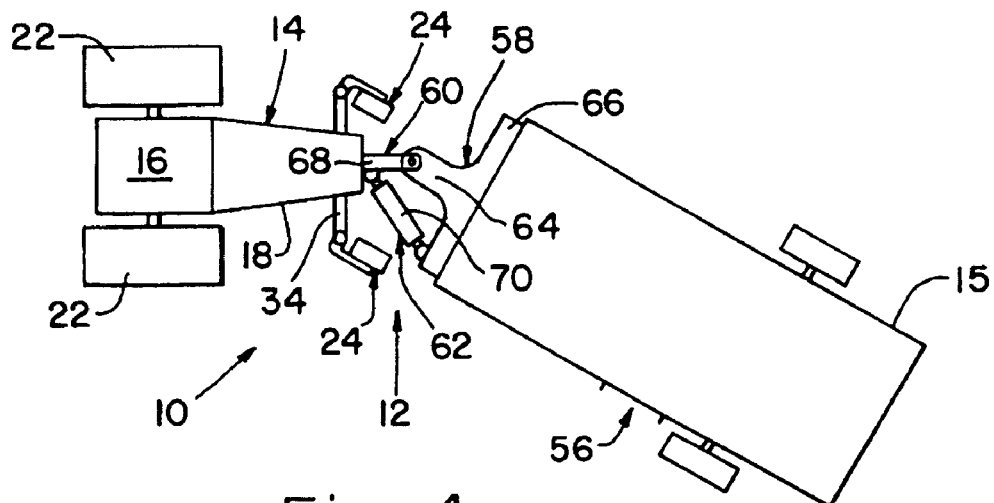
FIG. 4 is another schematic, top view of the windrower shown in FIGS. 1-3, with the cutting platform in an articulated position.

Referring to FIGS. 2-4, articulated transport arrangement 12 generally includes a first hitch 58, second hitch 60, and at least one actuator 62. First hitch 58 is positioned at an end of cutting platform 15 and is associated with a second mounting location. The first mounting location on cutting platform 15 associated with feeder opening 56 is used during a field mode, and the second mounting location on cutting platform 15 associated with first hitch 58 is used during a transport mode.

First hitch 58 can be selectively mounted at either end of cutting platform 15. In the embodiment shown, first hitch 58 includes a tongue 64 extending from a frame 66 of cutting platform 15. The extent to which tongue 64 extends from frame 66 depends on the particular application. Tongue 64 preferably is rigidly but detachably connected to frame 66 so that it can be removed during operation in a field mode, but could be non-detachably connected with frame 66. Alternatively, tongue 64 can be pivotally attached to frame 66 to pivot out of the way during a field mode.

Second hitch 60 is mounted to the rear end of traction unit frame 17, and is configured to mate with first hitch 58 on cutting platform 15. The specific interconnection between first hitch 58 and second hitch 60 can vary, such as a pinned connection, ball and socket, etc. In the embodiment shown, second hitch 60 includes a tongue 68 extending from frame 17 of traction unit 14. The extent to which tongue 68 extends from frame 17 depends on the particular application. Tongue 68 is non-detachably and immovably attached to frame 17, but can be configured to be moved out of the way during operation in a field mode. For example, tongue 68 can be pivotally attached to frame 17 to pivot out of the way during a field mode.

In the embodiment shown in FIGS. 2-4, articulated transport arrangement 12 includes an actuator in the form of a single hydraulic cylinder 70. Cylinder 70 couples between traction unit frame 17 and cutting platform frame 66. Cylinder 70 is used to adjust a relative angular orientation between traction unit frame 17 and cutting platform frame 66 when first hitch 58 and second hitch 60 are mated together. Single actuator 70 need not be in the form of a hydraulic cylinder, and could be, e.g., in the form of a pneumatic cylinder or other type of linear actuator.

During operation of windrower 10 in a field mode, cutting platform 15 is mounted to lift arms 52 in a crosswise position at the front of traction unit 14. VCU 40 receives a signal from switch 50 indicating that operation is in a field mode, and also receives output signals from steering sensor 42 corresponding to the angular orientation or position of the steering input device 48 in the form of a steering wheel or joysticks, etc. VCU 40 communicates with TCU 44, which in turn controls operation of drive wheels 22 in normal dual hydrostatic mode.

When in a transport mode, cutting platform 15 is detached from lift arms 52, and first and second hitches 58 and 60 are coupled together. Cylinder 70 is coupled between traction unit frame 17 and cutting platform frame 66. VCU 40 receives a signal from switch 50 indicating that operation is in a transport mode, and also receives output signals from steering sensor 42 corresponding to the angular orientation or position of the steering input device 48 in the form of a steering wheel or joysticks, etc. VCU 40 communicates with TCU 44, which in turn controls operation of drive wheels 22. Concurrently VCU 40 controls operation of cylinder 70 to adjust the relative angular orientation between traction unit frame 17 and cutting platform frame 66. Articulated steering between traction unit 14 and cutting platform 15 is thereby carried out.

Although the method of operation of windrower 10 is described above with regard to pulling cutting platform 15, it will also be appreciated that the cutting platform 15 can also be pushed in a transport mode using traction unit 14. Cutting platform 15 could be mounted in the transport configuration at either the front or rear of traction unit 14 during a push mode. The control logic would be very similar, based upon input from switch 50, steering wheel position, etc.

Further, with the method of operation of windrower 10 as described above, the differential speed between the drive wheels is coordinated with the articulated steering using cylinder 70 under control of VCU 40. It is also possible, however, that in a dual path hydrostatic drive, for example, there is enough intrinsic leakage in the hydraulic ground drive circuit to keep the relative speed of drive wheels 22 within an acceptable range of an articulated steering command.

Alternately, the drive wheel motors of a dual path hydrostatically driven machine could be configured to work as a differential. This could be done by providing a hydraulic path between the inlets of the two drive wheel motors 26 to allow hydraulic oil to pass from one drive wheel motor 26 to the other drive wheel motor 26 as required to attain the correct relative speed between drive wheels 22. This path could be provided by a hydraulic line or hose connecting the drive wheel motor inlet ports. A controlled restriction in this line may be desirable to modulate the flow between the drive wheel motors. A shutoff valve included in the bypass circuit would be used to close the path between the drive wheel motors whenever steering through the dual path hydrostat system is desired. This would be the case whenever the platform is mounted on the front of the machine rather than in the articulated configuration.

Additionally, although the method of operation of windrower 10 as described above uses an electronic control approach, it is also possible to use a hydraulic steering valve to control the position of hydraulic cylinder 70. The steering valve would be controlled by turning a steering wheel, similar to conventional steering of a combine or tractor. One or more steering cylinder(s) would, in turn, be controlled by the steering valve similar to conventional steering arrangements, except that instead of controlling the position of steered wheels, the steering cylinder (hydraulic cylinder 70) would be configured to control the position of the articulated joint between traction unit 14 and cutting platform 15. This articulated steering configuration would likely also use a hydraulic bypass hose connected between the inlets to the drive wheel motors 26, as described in the preceding paragraph. The bypass hose would likely be open in the articulated steering mode and closed when cutting platform 15 is mounted and operating in a field mode.

Figure 5:
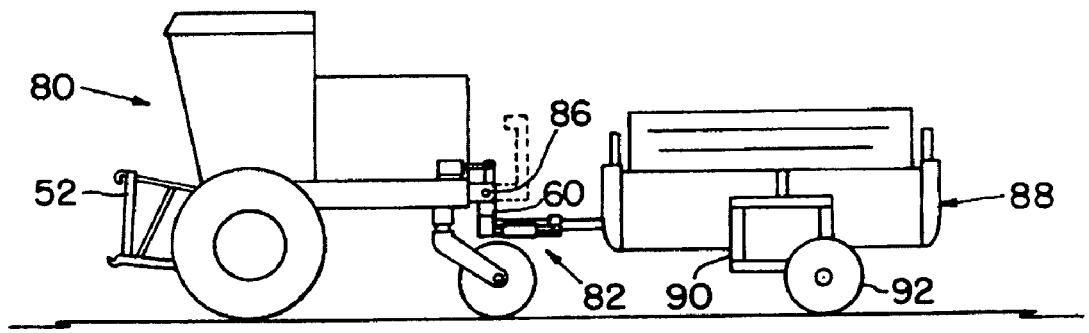
FIG. 5 is a schematic, side view of another embodiment of a windrower of the present invention.
Figure 6:
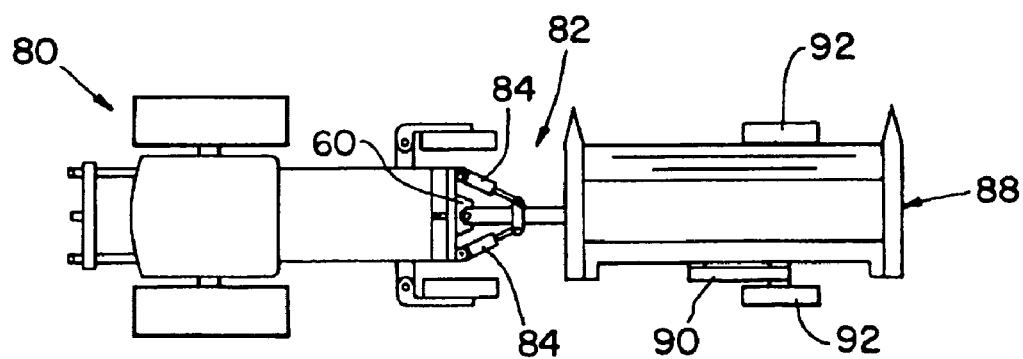
FIG. 6 is a schematic, top view of the windrower shown in FIG. 5.

Referring now to FIGS. 5 and 6, there is shown another embodiment of a windrower 80 incorporating an embodiment of an articulated transport arrangement 82 of the present invention. Windrower 80 is similar to windrower 10 in many respects, with the primary differences emphasized below.

Articulated transport arrangement 82 includes an actuator in the form of a pair of hydraulic cylinders 84. Cylinders 84 couple between traction unit frame 17 and tongue 64 extending from cutting platform frame 66. Cylinders 84 are under control of controller 36 and are used to adjust a relative angular orientation between traction unit frame 17 and cutting platform frame 66 when first hitch 58 and second hitch 60 are mated together.

Hitch 60 of articulated transport arrangement 82 is pivotally coupled with traction unit frame 17 about a horizontal axis 86 to allow hitch 60 to be pivoted up and out of the way to a field position (shown in phantom lines in FIG. 5) when not in use.

Cutting platform 88 is transported on a trailer or cart 90 having a pair of transport wheels 92. This is in contrast with cutting platform 15 above, wherein the transport wheels are detachably carried by frame 66 (either as original equipment or added on as a retrofit). Cutting platform 88 can be lifted and placed on cart 90 using pallet forks or the like, or cart 90 can drop down to allow cutting platform 88 to be simply placed thereon with lift arms 52 and detached.

Having described the preferred embodiment, it will become apparent that various modifications can be made without departing from the scope of the invention as defined in the accompanying claims.

The invention claimed is:

1. An agricultural windrower, comprising:
   a traction unit having a frame and steering input device, the steering input device comprising at least one of an operator actuated steering wheel and one or more operator actuated joysticks for inputting a steering command;
   a cutting platform having a longitudinal extension, a feeder opening associated with a first mounting location, and a first hitch at an end of said cutting platform associated with a second mounting location;
   a lift assembly carried by said frame, said lift assembly configured to mount with said cutting platform at said first mounting location; and
   an articulated transport arrangement mounted to said traction unit frame, said articulated transport arrangement including a second hitch configured for mating with said first hitch, and at least one actuator for coupling between and adjusting a relative angular orientation between said frame and said cutting platform when said first hitch and said second hitch are mated together and a steering sensor sensing a position of the steering input device and providing an output signal and an electrical processing circuit receiving said output signal, said electrical processing circuit controlling said at least one actuator dependent solely upon said output signal.

2. The agricultural windrower of claim 1, including an operator input device coupled with said electrical processing circuit, said operator input device providing a first output signal to said electrical processing circuit for normal steering using only said traction unit, and a second output signal to said electrical processing circuit for articulated steering between said traction unit and said cutting platform.

3. The agricultural windrower of claim 2, wherein said operator input device is a two position switch.

4. The agricultural windrower of claim 1, wherein said articulated transport arrangement is mounted to said frame at one of a front and a rear of said traction unit.

5. The agricultural windrower of claim 1, wherein said at least one actuator is a pair of hydraulic cylinders.

6. The agricultural windrower of claim 1, wherein said cutting platform includes a frame and a tongue, and said at least one actuator couples between said traction unit frame and one of: said cutting platform frame and said cutting platform tongue.

7. The agricultural windrower of claim 1, wherein said articulated transport arrangement is pivotably coupled with said traction unit frame about a generally horizontal axis, and may be pivoted to a field position during non-use.

8. The agricultural windrower of claim 1, including a pair of transport wheels associated with said cutting platform for carrying said cutting platform when in transport.

9. The agricultural windrower of claim 8, wherein said pair of transport wheels are one of carried by said cutting platform frame and part of a separate transport trailer.

10. The agricultural windrower of claim 1, wherein said windrower includes a pair of rear caster wheels passively accommodating articulating movement between said traction unit and said cutting platform at an axis defined by said second hitch.

11. The agricultural windrower of claim 1, wherein said lift assembly includes a pair of lift arms.

12. An articulated transport arrangement in a windrower for interconnecting a traction unit with a cutting platform, said articulated transport arrangement comprising:
 a first hitch attachable to an end of the cutting platform;
 a second hitch attachable to the traction unit and configured for mating with said first hitch;
 at least one actuator for coupling between and adjusting a relative angular orientation between the traction unit and the cutting platform when said first hitch and said second hitch are mated together;
 a steering input device, the steering input device comprising at least one of an operator actuated steering wheel and one or more operator actuated joysticks for inputting a steering command, the steering input device having a steering sensor for sensing a position of the steering input device; and,
 an operator input device couplable with an electrical processing circuit onboard the traction unit, said operator input device configured for providing a first output signal to the electrical processing circuit for normal steering using only the traction unit, and a second output signal to the electrical processing circuit for articulated steering between the traction unit and the cutting platform, the steering sensor providing an output signal and the electrical processing circuit receiving said output signal, said electrical processing circuit controlling said at least one actuator dependent solely upon said output signal during articulated steering.

13. The articulated transport arrangement of claim 12, wherein said operator input device is a two position switch.

14. The articulated transport arrangement of claim 12, wherein said articulated transport arrangement is configured to be mountable to the traction unit at one of a front and a rear of the traction unit.

15. The articulated transport arrangement of claim 12, wherein said at least one actuator is a pair of hydraulic cylinders.

16. The articulated transport arrangement of claim 12, including a pair of transport wheels for carrying the cutting platform when in transport.

17. The articulated transport arrangement of claim 16, including a transport trailer having said pair of transport wheels.

* * * * *